US006229279B1

United States Patent
Dierker

(10) Patent No.: US 6,229,279 B1
(45) Date of Patent: May 8, 2001

(54) DUAL BATTERY SYSTEM

(75) Inventor: Uwe Dierker, Isenbüttel (DE)

(73) Assignee: Volkswagen AG, Wolfburg (*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,204

(22) Filed: Sep. 16, 1999

(30) Foreign Application Priority Data

Sep. 17, 1998 (DE) .................................. 198 42 657

(51) Int. Cl.⁷ .................. H02J 7/00; B06L 1/00; H01M 12/00
(52) U.S. Cl. .................. 320/104; 320/126; 307/10.1; 429/9
(58) Field of Search .................. 320/104, 103, 320/117, 126; 307/10.1; 429/9

(56) References Cited

U.S. PATENT DOCUMENTS

| 5,316,868 | * | 5/1994 | Dougherty et al. | 429/9 |
| 5,325,038 | | 6/1994 | Banzai et al. | |
| 5,488,283 | * | 1/1996 | Dougherty et al. | 307/10.1 |
| 5,726,553 | * | 3/1998 | Waugh | 320/104 |
| 5,764,032 | * | 9/1998 | Moore | 320/126 |
| 5,962,928 | | 10/1999 | Schenk | |

FOREIGN PATENT DOCUMENTS

| 38 41 769 C1 | 6/1990 | (DE) | B60R/16/04 |
| 40 28 242 A1 | 3/1992 | (DE) | B60R/16/04 |
| 196 51 612 A1 | 6/1998 | (DE) | H02J/9/06 |
| 0 583 630 A1 | 2/1994 | (EP) | B60R/16/02 |

* cited by examiner

*Primary Examiner*—Peter S. Wong
*Assistant Examiner*—Gregory J. Toatley, Jr
(74) *Attorney, Agent, or Firm*—Kenyon & Kenyon

(57) ABSTRACT

This invention provides a dual-battery system (1) and a method for activating it, which comprises a starter battery (2), a generator (3), primary load (4), a vehicle electrical system battery (6), a starter (8), and a power switch (10), arranged between the starter battery (2) and vehicle electrical system battery (6), by way of which the starter battery (2) and vehicle electrical system battery (6) can be connected together in parallel during the starting operation, and further includes a controllable electronic switch (13) connected in parallel to a power switch (10).

9 Claims, 6 Drawing Sheets

DUAL BATTERY SYSTEM

FIELD OF THE INVENTION

The invention relates to an improved dual-battery system and a method for its operation.

BACKGROUND OF THE INVENTION

A known dual-battery system includes a starter battery and a vehicle electrical system battery, e.g., see: German Patent 40 28 242 A1. Arranged between the starter battery and the vehicle electrical system battery is a starter battery switch that is closed during a starting operation so that both batteries are connected to one another. Primary and secondary loads are then powered via both batteries. "Primary load" is understood to be loads essential for starting and driving capability or for vehicle safety, and "secondary load" to be for comfort components. In order to prevent any discharge of the starter battery, a control device senses the charge states of each of the starter battery and the vehicle electrical system battery. If the charge state of the starter battery drops below that of the vehicle electrical system battery, so that charging of the vehicle electrical system battery would take place at the expense of the starter battery, the control device will break the connection between the batteries by opening the starter battery switch. The known dual-battery system is disadvantageous firstly because the starter battery is on-load even after the starting operation has taken place, and secondly because the complexity of measuring and sensing the charge states of the two batteries is quite substantial.

OBJECTS AND SUMMARY OF THE INVENTION

An object of this invention is therefore to provide a dual-battery system in which the starter battery is on-load only in the starting phase and the starter battery can nevertheless be charged at any time when the load state permits, and which requires little investment in terms of circuit engineering.

The present invention provides a dual-battery system, which comprises: a starter battery, a generator, a primary load, a vehicle electrical system battery, a starter, a power switch connected between the starter battery and vehicle electrical system battery so that the starter battery and vehicle electrical system battery can be connected together in parallel during operation of the starter, and a controllable electronic switch connected in parallel to the power switch.

The present invention further provides a method for controlling a dual-battery system of the type described in the preceding paragraph, which involves, a) sensing the charge balance of the starter battery and the vehicle electrical system battery by the current profile at the controllable electronic switch, preferably a MOSFET, and b) making the electronic switch conductive whenever a charging current can flow from the vehicle electrical system battery to the starter battery.

Because a controllable electronic switch, in particular a MOSFET, is arranged parallel to the power switch, it is very easy to sense, by way of the internal current measurement capability of the MOSFET, whether the charge state of the starter battery and vehicle electrical system battery allows charging of the starter battery. By generating a gate voltage of the correct sign, in such a situation a charging path can be enabled and the starter battery can be charged. Otherwise, the MOSFET disconnects the starter battery from the primary and secondary load so that the starter battery is on-load exclusively in the starting operation. Since all the control data are already available internally in the MOSFET, separate measurement shunts are unnecessary and the configuration of the control device can also be very simple. Further advantageous embodiments of the invention are evident from the dependent claims.

In a preferred embodiment, there is arranged between the vehicle electrical system battery and the primary load a switch with which, prior to the starting operation, the supply of power to the primary load can be selectably switched over between the vehicle electrical system battery and the starter battery, preferably, this switch is also a MOSFET.

Preferably the two, above-mentioned, MOSFETs are polarized oppositely to one another, so that either the two source or the two drain terminals are connected to one another, so that a short-circuit path cannot occur via the parasitic diodes of the MOSFETs.

BRIEF DESCRIPTION OF THE DRAWINGS

The invention will be explained below in more detail with reference to a preferred exemplary embodiment. In the drawings.

DETAILED DESCRIPTION OF THE INVENTION

Figure 1:
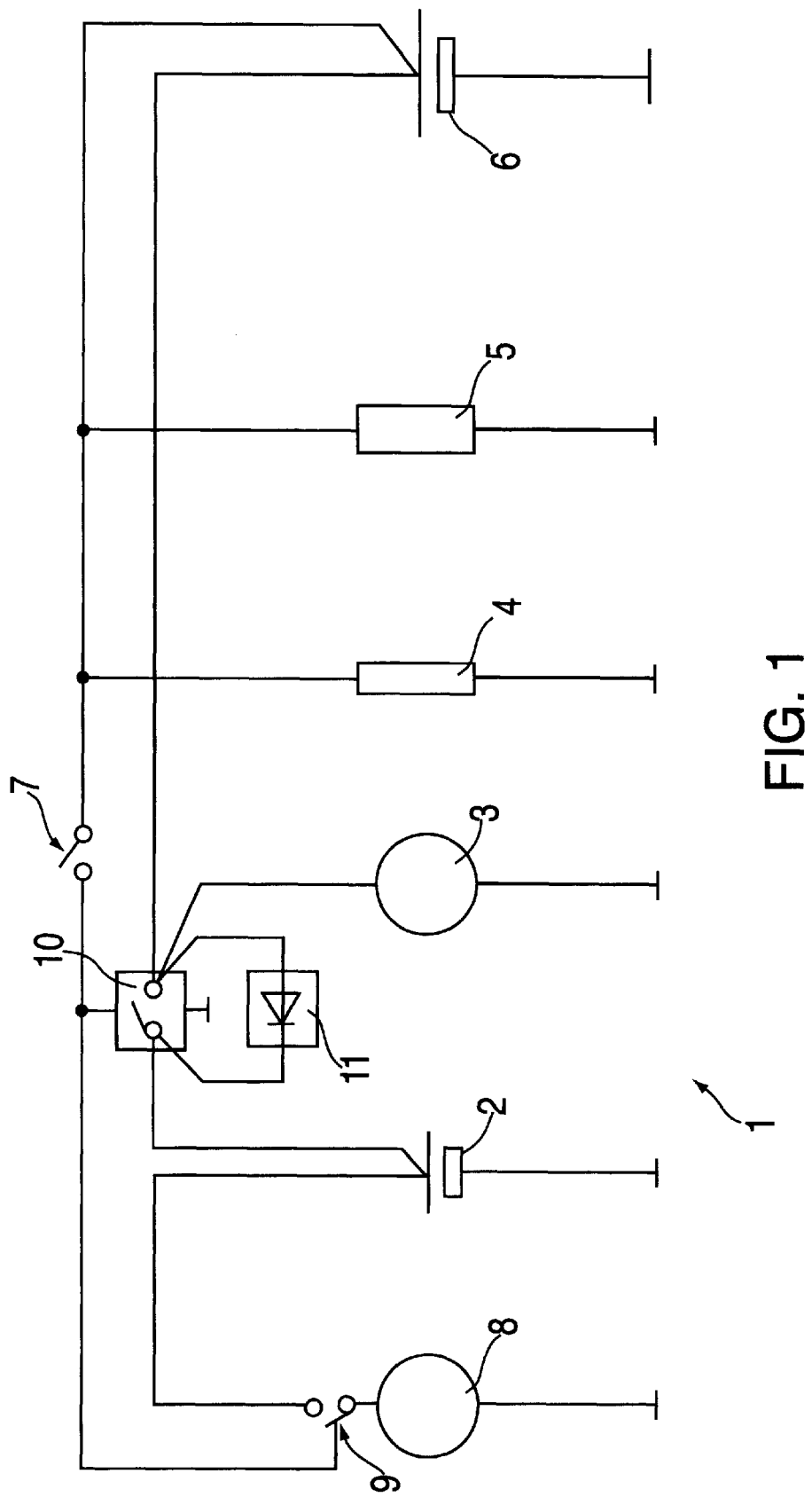
FIG. 1 shows a circuit arrangement of a dual-battery system having diodes connected in parallel.

Battery system 1 includes a starter battery 2, a generator 3, primary load 4, secondary load 5, a vehicle electrical system battery 6, an ignition switch 7, and a starter 8 with an associated switch 9. A power switch 10 with diode 11 connected in parallel is disposed between starter battery 2, and generator 3 and vehicle electrical system battery 6. Prior to the initiation of a starting operation, each of switches 7, 9, and 10, are open. Primary load 4, necessary for the starting operation, e.g., an engine control device, is powered exclusively via vehicle electrical system battery 6. When ignition switch 7 is then closed, for example, by turning the ignition key, the current flowing from vehicle electrical system battery 6 through ignition switch 7 causes switch 9 to close, so that the circuit between starter battery 2 and starter 8 is closed. A starter current therefore flows from starter battery 2 to a starter motor associated with starter 8; that motor begins to turn and attempts to start an internal combustion engine. The closing of ignition switch 7 also causes power switch 10 to close, so that starter battery 2 and vehicle electrical system battery 6 are connected in parallel. Depending on the charge state of the two batteries, a charge equalization then takes place between them, and both batteries are available for powering primary load 4 and starter 8. Once the starting operation has ended, each of switches 7, 9, and 10 are then opened again, so that starter battery 2 is not on-load in normal operation. Diode 11 constitutes a charging path between vehicle electrical system battery 6 and generator 3, and starter battery 2, so that a charging current can flow through diode 11 if the voltage difference between vehicle electrical system battery 6 and starter battery 2 becomes greater than 0.7 V. If the voltage difference is less, however, diode 11 is then inhibited and the starter battery is protected against discharge. The advantage of this arrangement is that the charging path through the diode does not require a separate control system. This arrangement does, however, also have a few disadvantages. On the one hand, the charging voltage for starter battery 2 is always reduced by a value equal to the voltage drop at diode 11. On the other hand, an engine start cannot be accomplished if vehicle electrical system battery 6 has been discharged to such an extent that it can no longer power primary load 4. This would then require that power switch 10 be closed even before the actual starting operation, in order to charge vehicle electrical system battery 6 sufficiently via starter battery 2. Once again, however, this requires increasing cost for a control device (not shown).

Figure 2:
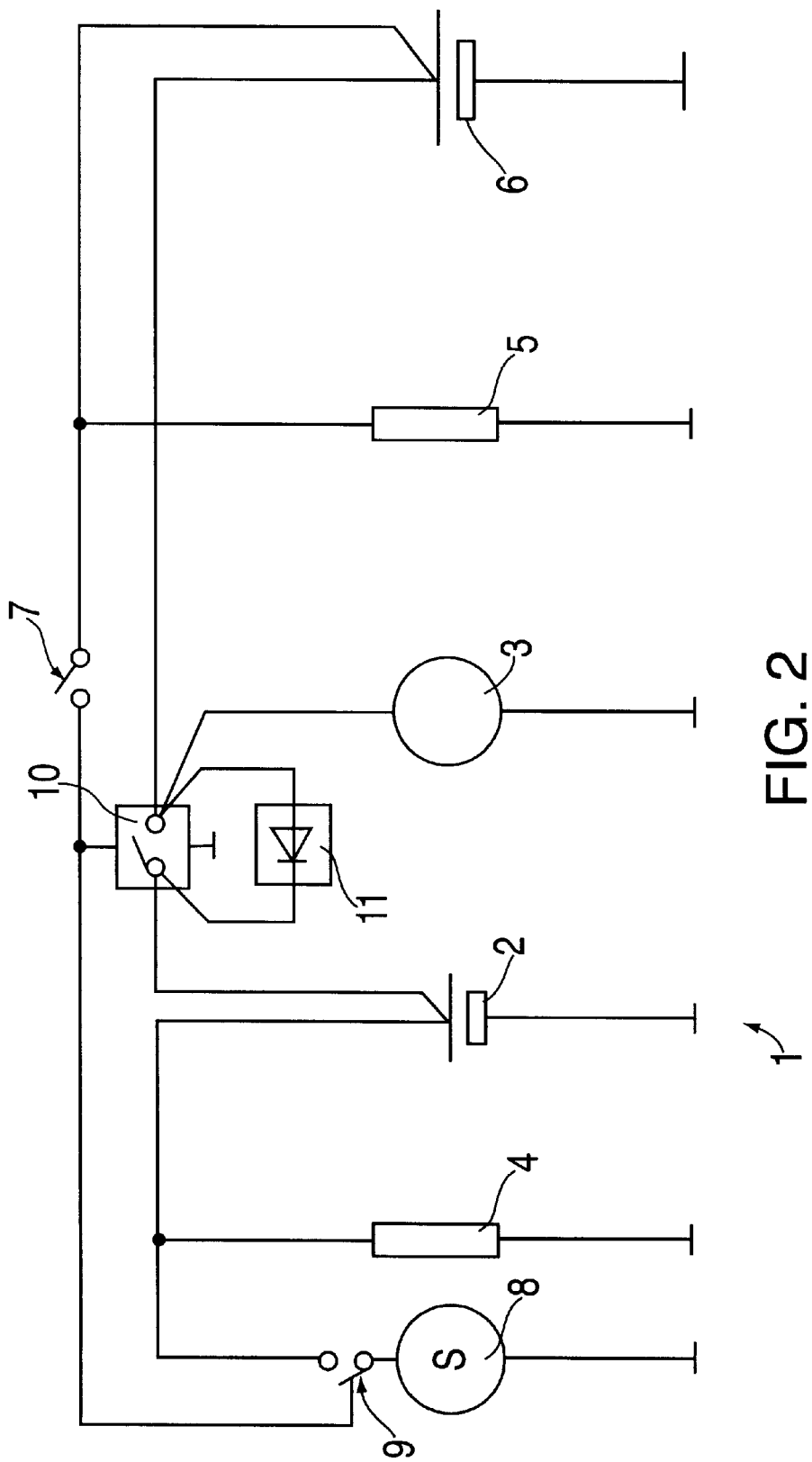
FIG. 2 shows a circuit arrangement with a primary load associated with the starter battery.

One possible solution to the problem of powering primary load 4 during the starting operation when vehicle electrical system battery 6 is discharged is shown in FIG. 2. For this purpose, primary load 4 is connected in parallel with starter battery 2, thus ensuring that they are powered even if vehicle electrical system battery 6 is discharged. A disadvantage of this arrangement is that the primary load 4 is powered at the expense of starter battery 2. If the charging path via diode 11 is inhibited in normal operation starter battery 2 then powers primary load 4 and can thereby be discharged. If the charging path via diode 11 is enabled, then on the one hand the charging voltage is again reduced by a value equal to the voltage drop through diode 11, and on the other hand the charging current is distributed to starter battery 2 and primary load 4, thus degrading the charging of starter battery 2 in normal operation.

Figure 3:
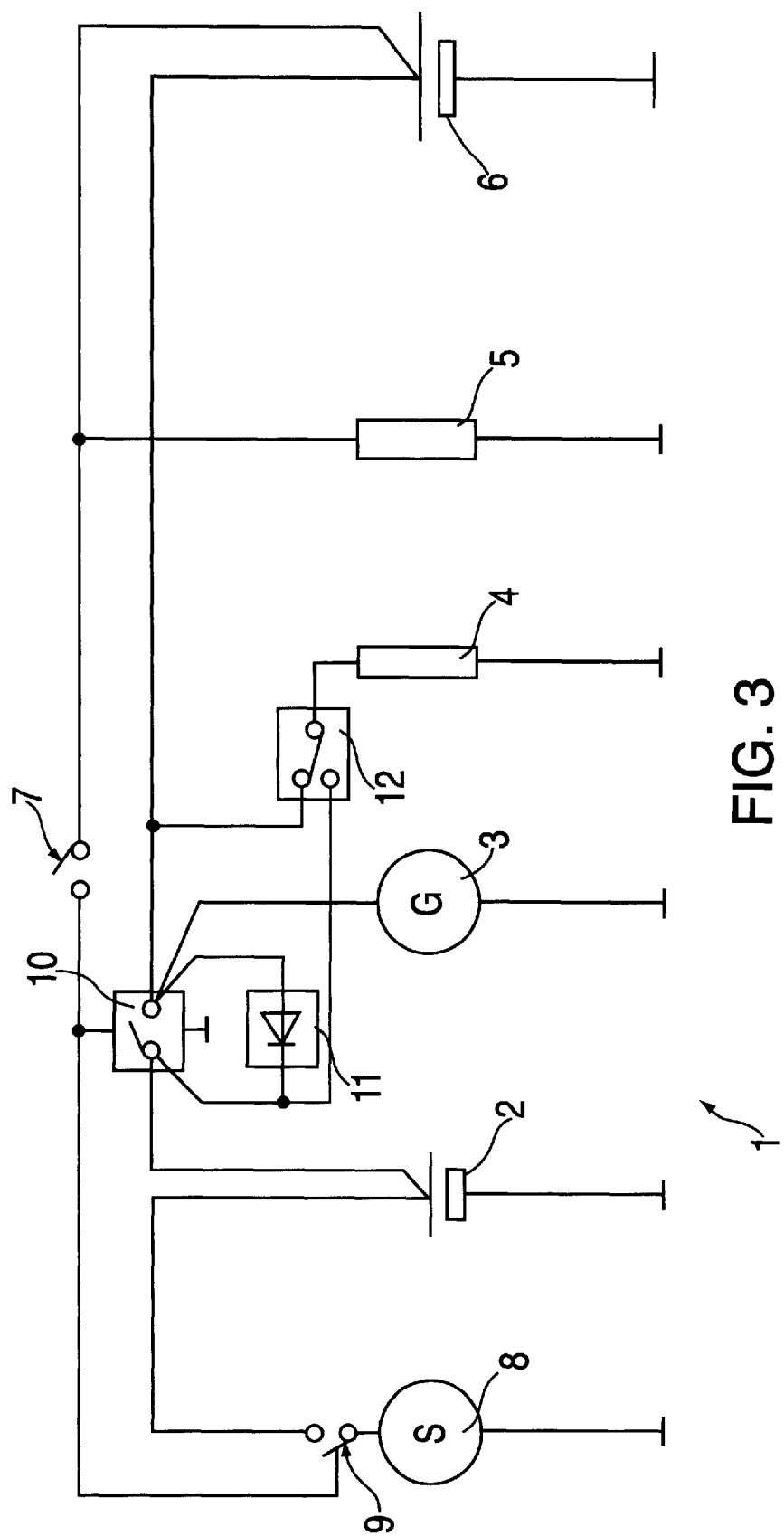
FIG. 3 shows a circuit arrangement having an additional changeover switch between the starter battery and vehicle electrical system battery.

To avoid such discharging of starter battery 2, a changeover switch 12 is associated with primary load 4 so that primary load 4 can be switched over between vehicle electrical system battery 6 and starter battery 2, as shown in FIG. 3. In conventional configurations, primary load 4 would be powered via vehicle electrical system battery 6. If vehicle electrical system battery 6 is discharged, however, then primary load 4 is connected via changeover switch 12 to starter battery 2. A disadvantage of this arrangement is the additional changeover switch 12. Moreover, a measurement shunt (not shown) is necessary in order to sense the switchover conditions and the charging voltage for starter battery 2 is still reduced by a value equal to the voltage drop at diode 11.

Figure 4:
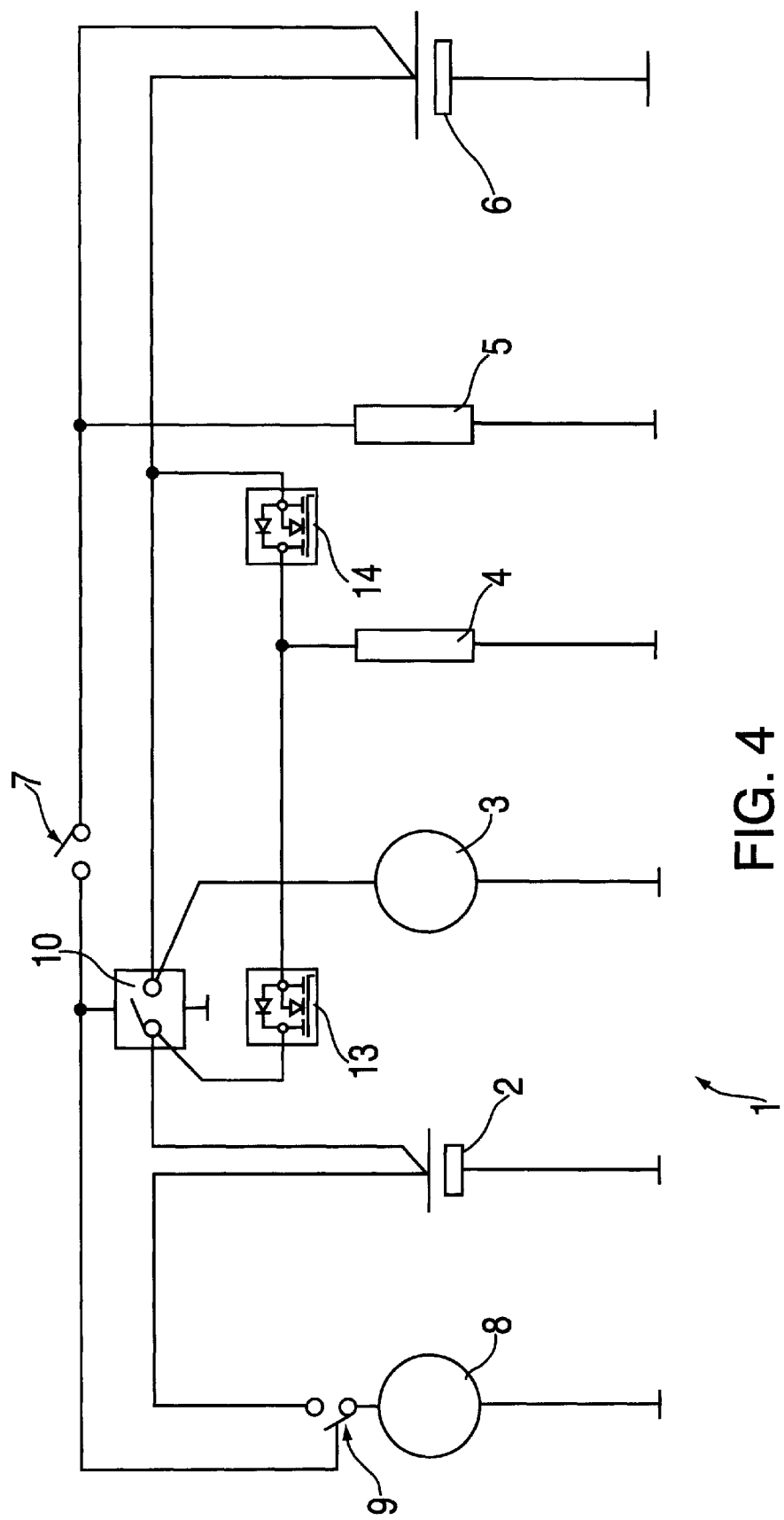
FIG. 4 shows a circuit arrangement with MOSFETs.

A comprehensive solution to the problem is realized by way of the circuit arrangement as shown in FIG. 4, in which diode 11 has been replaced by a power MOSFET 13 whose drain terminal is connected to starter battery 2, and whose source terminal is connected to primary load 4. In addition, a further power MOSFET 14 is arranged between the source terminal and vehicle electrical system battery 6. As manufactured, power MOSFETs 13 and 14 have a parasitic diode in the inverse direction, which is shown in the circuit arrangement parallel to the actual transistor section. MOSFETs 13 and 14 may possess an internal current measurement system, overcurrent protection, and temperature protection. In normal operation, MOSFET 14 is made conductive by way of a corresponding gate voltage, and MOSFET 13 is inhibited. In this operational condition the circuit's operation is similar to that of the circuit shown in FIG. 1. If, during operation, the voltage of starter battery 2 drops below that of vehicle electrical system battery 6, a charging current can then flow through the parasitic diodes of MOSFET 13, if the voltage difference exceeds approximately 0.7 V. The flow of this charging current can be sensed via the internal current measurement system of the control device 15 (shown in FIG. 5). The control device then generates a gate voltage for MOSFET 13, so that the latter becomes conductive and is driven inversely. As a result, the charging current can flow from vehicle electrical system battery 6 via the source terminal to the drain terminal of MOSFET 13 and charge the starter battery 2. Since the internal resistance of MOSFET 13 when conductive is approximately 10 mΩ, almost the entire voltage of vehicle electrical system battery 6 is available as charging voltage. Based on the current profile, the control device can then sense the completion of the charging operation and can again inhibit MOSFET 13. If vehicle electrical system battery 6 is discharged prior to a starting operation, the control device can sense this based on the current profile at MOSFET 14 or the voltage of vehicle electrical system battery 6, and inhibit them. MOSFET 13 is then enabled, so that primary load 4 is powered via starter battery 2. One problem with the circuit configuration, as shown in FIG. 4, is that in the event of a defective switch 10 that does not close, a short-circuit current can flow from vehicle electrical system battery 6 through the parasitic diodes of MOSFETs 13 and 14 to the starter battery.

Figure 5:
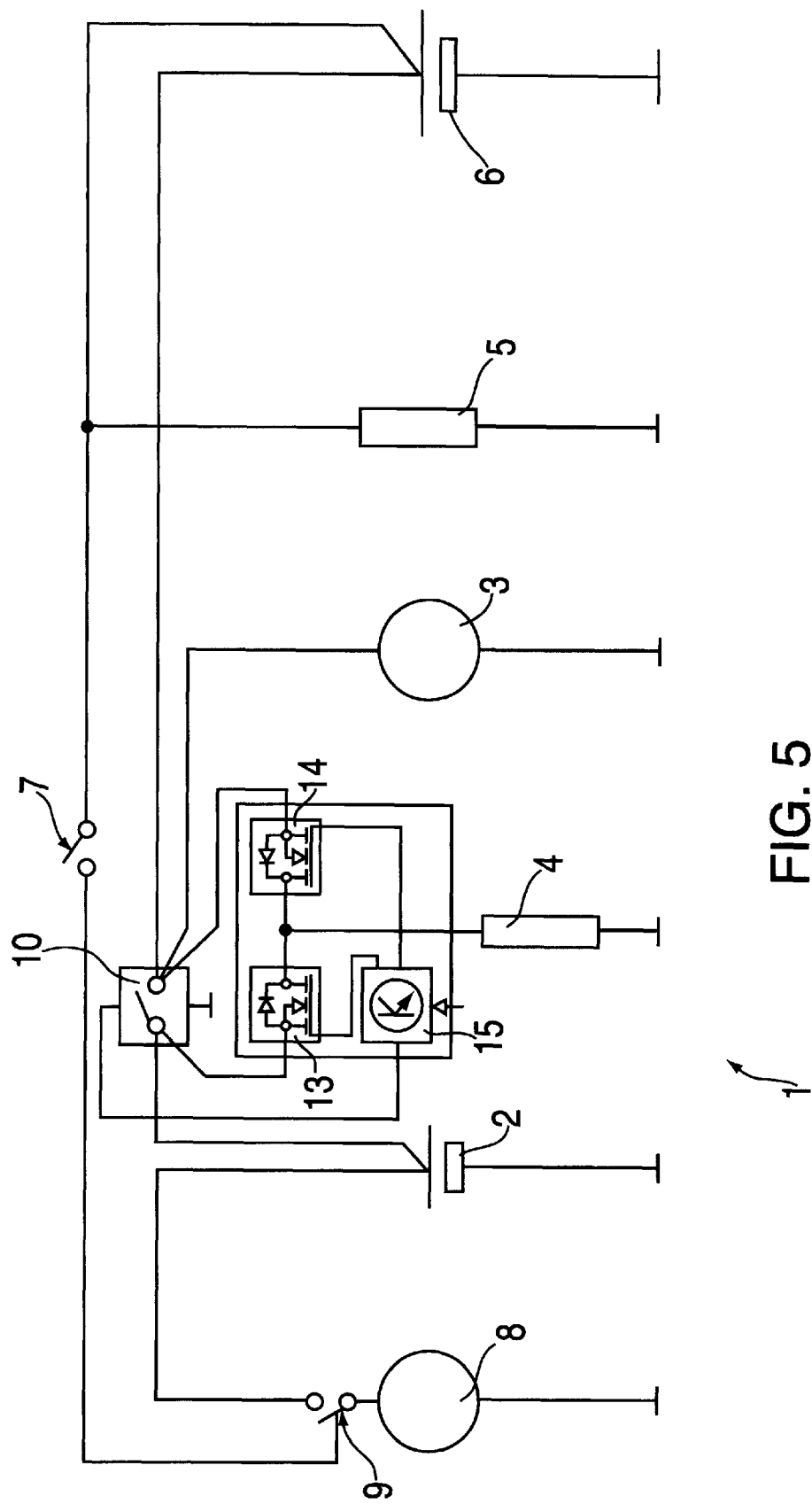
FIG. 5 shows a circuit arrangement with oppositely polarized MOSFETs having a common drain terminal.
Figure 6:
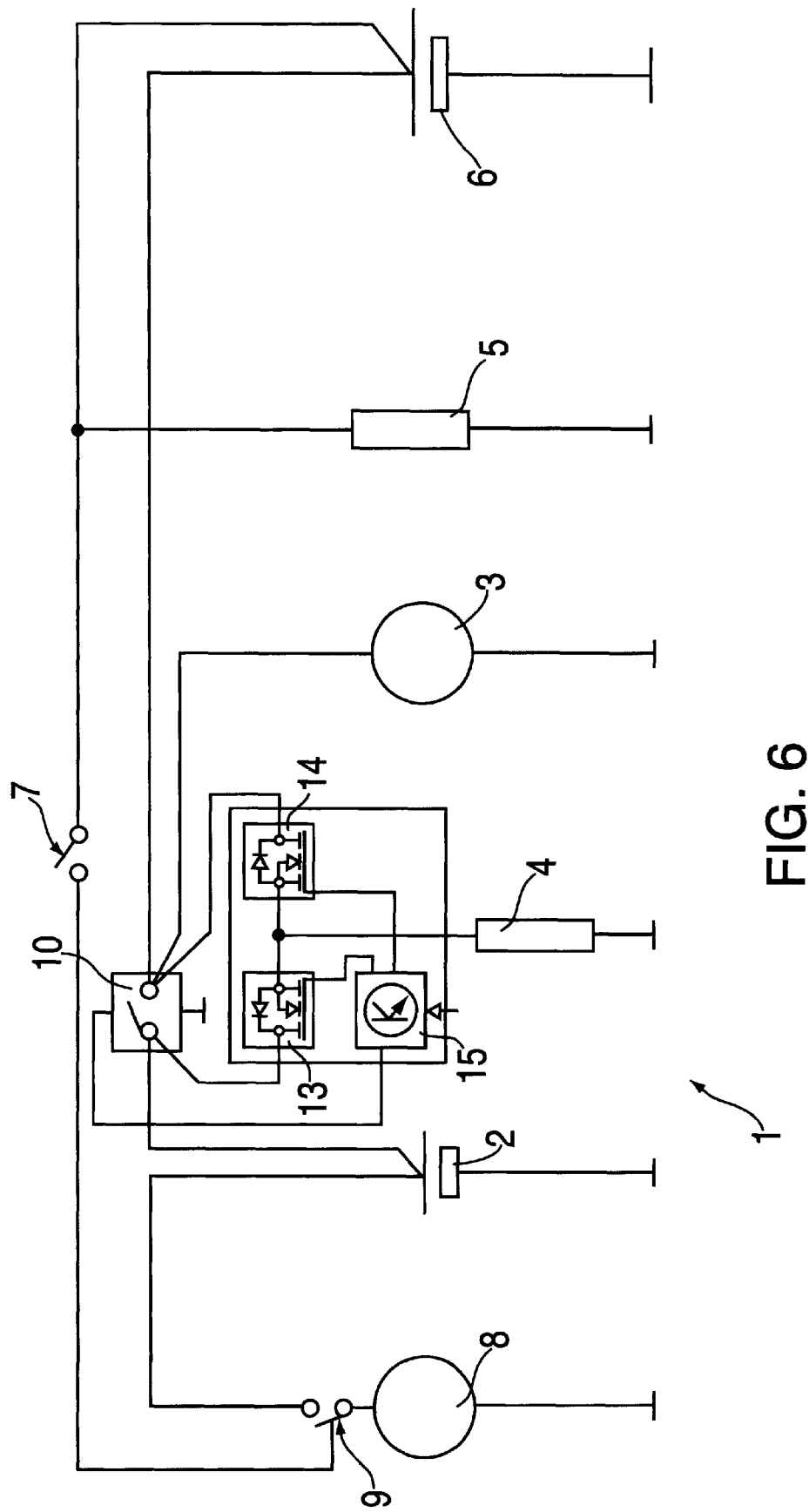
FIG. 6 shows a circuit arrangement with a common source terminal.

To solve this problem, MOSFETs 13 and 14 can be polarized oppositely to one another, as depicted in FIG. 5. This is done by connecting the source terminal of MOSFET 13 to starter battery 2. As a result, the parasitic diode of MOSFET 13 is polarized in the inhibiting direction in the event of a defective switch 10 and prevents any discharge of vehicle electrical system battery 6. Given a corresponding potential at primary load 4, it is nevertheless still possible for a current to flow from starter battery 2 to primary load 4 and discharge the starter battery. The polarization directions of the two MOSFETs 13 and 14 are therefore reversed, as depicted in FIG. 6. In the event of a short-circuit, the parasitic diode of MOSFET 14 is inhibited, and the discharge path of starter battery 2 is inhibited by the parasitic diode of MOSFET 13. As schematically indicated, the two MOSFETs 13 and 14 and switch 10, can be activated by a common control device 15 of simple configuration.

What is claimed is:

1. A dual-battery system comprising a starter battery, a generator, a primary load, a vehicle electrical system battery, a starter, and a power switch, connected between the starter battery and vehicle electrical system battery so that the starter battery and vehicle electrical system battery can be connected together in parallel during operation of the starter, and a first controllable electronic switch connected in parallel to the power switch.

2. The dual-battery system as defined in claim 1, wherein the controllable electronic switch is a first MOSFET having a drain terminal and a source terminal.

3. The dual-battery system as defined in claim 2, wherein the drain terminal of the first MOSFET is connected to the starter battery, and the source terminal is connected to the vehicle electrical system battery.

4. The dual-battery system as defined in claim 1, 2 or 3, further comprising a second controllable electronic switch connected between the vehicle electrical system battery and the primary load so that the current path between the vehicle electrical system battery and the primary load can be cut off.

5. The dual-battery system as defined in claim 4, wherein the second controllable electronic switch is a second MOSFET device.

6. The dual-battery system as defined in claim 4, wherein the first and second MOSFETs are arranged oppositely polarized to one another.

7. The dual-battery system as defined in claim 5, wherein the source terminals of the first and second MOSFET is connected to one another.

8. A method for controlling a dual-battery system including a starter battery, a generator, a primary load, a vehicle electrical system battery, a starter, and a power switch, connected between the starter battery and vehicle electrical system battery so that the starter battery and vehicle electrical system battery can be connected together in parallel during operation of the starter, and a first controllable electronic switch connected in parallel to the power switch which comprises:
a) sensing a charge balance between the starter battery and the vehicle electrical system battery based on a current profile at the first controllable electronic switch; and
b) making the first controllable electronic switch conductive when a charging current can flow from the vehicle electrical system battery to the starter battery.

9. The method as defined in claim 8, wherein the first controllable electronic switch is a MOSFET and, before the starting operation begins, a current profile at the MOSFET is measured, as to the charge state of the vehicle electrical system battery, and when the vehicle electrical system battery is discharged, a second MOSFET is inhibited by the control device and the first controllable electronic switch is made conductive.

\* \* \* \* \*